(No Model.)

L. SNYDER.
TEACHING CHART.

No. 577,886. Patented Mar. 2, 1897.

Fig. 1

| Bird | Nest | Kitty | Dog |
| Cat | Boy | Frog | Whip |
| Egg | Girl | Hat | Gun |
| Fox | Top | Drum | Ship |
| Cage | Doll | Cow | Fly |

Fig. 2

| I | see | a bird |
| I | see | a nest |
| I | see | a kitty |
| I | see | a dog |
| I | see | a cat |
| I | see | a boy |

Fig. 3

| I | see | a whip |
| I | see | a girl |
| I | see | an egg |
| I | see | a hat |
| I | see | a dress |
| I | see | a fox |

Fig. 4

| You | see | a bird |
| You | see | a girl |
| You | see | an egg |
| You | see | a hat |
| You | see | a dress |
| You | see | a fox |

Fig. 5

| I | have | a bird |
| I | have | a nest |
| I | have | a kitty |
| I | have | a dog |
| I | have | a cat |
| I | have | a boy |

Fig. 6

| This dress | is | new |
| This cart | is | red |
| This hat | is | black |
| This gun | is | old |
| This boy | is | good |
| This doll | is | pretty |

Fig. 7

| Rob | runs |
| Tom | plays |
| You | jump |
| The bird | sings |
| The dog | barks |
| The cow | kicks |

Fig. 8

| I | see | a red | dress |
| I | see | a pretty | bird |
| John | has | a new | drum |
| Tom | has | a pretty | dog |
| Mary | sees | a little | kitty |
| My doll | has | a new | dress |

Witnesses:
C. F. Kilgore
B. H. Merchant

Inventor:
Louise Snyder
By her Attorney
Jas. F. Williamson

UNITED STATES PATENT OFFICE.

LOUISE SNYDER, OF MINNEAPOLIS, MINNESOTA.

TEACHING-CHART.

SPECIFICATION forming part of Letters Patent No. 577,886, dated March 2, 1897.

Application filed May 17, 1895. Serial No. 549,615. (No model.)

*To all whom it may concern:*

Be it known that I, LOUISE SNYDER, a citizen of the United States, residing at Minneapolis, in the county of Hennepin and State of Minnesota, have invented certain new and useful Improvements in Teaching-Charts; and I do hereby declare the following to be a full, clear, and exact description of the invention, such as will enable others skilled in the art to which it appertains to make and use the same.

My invention relates to educational appliances, and has for its object to provide an improved chart which is especially designed to facilitate the teaching of words and sentences to young children.

To this end the invention consists of the novel features of construction hereinafter described, and defined in the claims.

All students of the human mind well know that in the process of apprehension in the case of young minds the concrete is comparatively easy and the abstract is comparatively hard or difficult. The young mind will readily associate the name of an object first with the object itself, if before the pupil's eyes, and afterward with a picture of the object in the mind. Likewise descriptive words which can be pictured, such as words indicative of color, shape, &c., are grasped by the young mind and remembered with ease as compared with words indicative of abstract properties, connectives, and verbs. Teachers find what they call "object" words readily taught, while they have great difficulty in making the young mind understand and remember verbs, connectives, and words representing abstract notions or conceptions. To a greater or less extent the same statements hold true in respect to adult minds.

My invention has for its object to meet this condition of the human mind by providing a chart wherein any desired word may be brought into reading relation with a great number of other words. For example, any given verb may be made to read with a common subject and an indefinite number of objects, and the object words may be changed without changing the verb or the subject. Likewise a great number of subjects may be brought into reading relation with the same verb and object. The range of these changes will be more readily understood after considering in detail the construction of my chart.

The device is illustrated in the accompanying drawings, wherein, like letters referring to like parts throughout the several views—

Figure 1 is a perspective view of the chart with the top or entire leaves hanging down in reading position. Fig. 2 is a similar view with the entire leaves turned up and one of the sectional leaves exposed in reading position. Fig. 3 is a similar view showing two of the sections of the leaf exposed in Fig. 2 in reading registration with the right-hand section of another leaf, or otherwise stated the right-hand section exposed in Fig. 2 has been turned up to expose an underlying section of another leaf. Fig. 4 is a similar view where the left-hand section or maybe several sections have been turned up to bring a new subject-section into reading relation with the verb-sections exposed in Fig. 2. Fig. 5 is a view similar to Fig. 2, but with the central or verb section of the top and maybe other leaves turned up to bring a new verb-section into reading relation with the subject and object sections exposed in Fig. 2. Fig. 6 is a similar view where all the sections have been shifted to substitute new words throughout. Fig. 7 is a perspective view showing a modification wherein the sectional leaves of the chart are composed of two sections only. Fig. 8 is a similar view of another modification wherein the sectional leaves of the chart are composed of four sections.

All the leaves of the chart are arranged so that they overlie each other and are bound or held together at their upper end by a binder $a$ of any suitable construction, which is shown as provided with eye-screws $a'$ for hanging up the chart to the wall or any other suitable support. One or more of the uppermost leaves $b$ are left entire, and on the same are printed or written the words or symbols which the children are expected to memorize by association either with the objects represented by the words or with mental pictures called up thereby. Sufficient of these entire leaves $b$ would be used to hold all the object words which it is expected to employ in the sentences which may be formed from the words printed on the sectional leaves $c$. The said leaves $c$ underlie the entire leaves $b$ and are divided into sections running crosswise of the lines of reading matter, as is well shown in Figs. 2 to 8, inclusive. The printed or written matter on the sectional leaves $c$ is so arranged that when certain sections of the same leaf are brought into sidewise registration with each other or with certain sections of other leaves the words thus exposed in the transverse or reading line will form a sentence or make sense. The matter is also arranged on the principle of a few verbs for a great many objects and subjects, so as to gradually familiarize the young mind with the verb by repeated impressions in a multitude of relations. With four or five verbs, for example, several hundred sentences can be formed by using a considerable number of object and subject words.

On the first sectional leaf, for example, as exposed in Fig. 2, the same subject and the same verb are repeated in the six lines for six different objects. By turning the right-hand or object section of the uppermost sectional leaf the right-hand or object section of the next lower sectional leaf may be brought into reading registration with the same verb and the same subject, as shown in Fig. 3; and so on, by shifting the object-sections, every one thereof on all the sectional leaves may be brought into reading registration with a common verb and subject. Likewise by shifting the left-hand or subject section, as shown, for example, in Fig. 4, the same verb may be made to read with a great number of subjects, while leaving the objects constant, as shown in Fig. 4, or while changing the same, as illustrated in Figs. 2 and 3. Likewise the subject and object sections may remain constant while the verb-section is changed, as shown in Fig. 5. Again, all the sections may be shifted to expose an entirely new set of words in the reading-line, as shown in Fig. 6.

From the foregoing illustrative statements and an inspection of the drawings it must be obvious that any word or class of words, for example, the verb, may be kept exposed before the eye of the child or other person and be brought into reading relation with a very large number of other words in succession. In this manner the difficult word may be kept constant or where it will make a repeated impression and the easy words be indefinitely shifted for union or coöperation with the difficult word. It must be apparent, therefore, that this chart will not only greatly assist in the mental act of apprehension in the case of individual words, but also in the case of uniting words or putting the same together into sentences. The verb is put into motion, it might be said, for union with a multitude of subjects and objects, or the subjects and objects put into motion in respect to the other words which coöperate therewith. Otherwise stated, this chart enables the teacher to bring before the eye of the pupil what might be called the "dynamics" of the subject of composition.

By actual experience with this chart I have demonstrated the efficiency of the same for the purposes had in view.

The number of sections is of course a question of choice or convenience, according to the brevity or length of the sentences which it is desired to be able to make. The two-section chart is necessarily more limited than one with a larger number of sections. The three-section chart is a very convenient form, but the chart may of course be made in any number of sections, from two upward.

It will be understood that the use of the word "sections" is simply a matter of convenience for the purpose of distinct definition. The so-called "sections" might equally well be called "separate leaves," and would, nevertheless, be within the principle of my invention, so long as they were capable of sidewise registration to bring together the coöperative elements of a reading line or expression.

What I claim, and desire to secure by Letters Patent of the United States, is as follows:

1. A chart or book comprising a plurality of slitted sectional leaves bound together at one edge, and containing words or reading matter, the slit or slits of one leaf registering with those of all the other leaves, whereby when one or more sections of one leaf are turned up, the reading matter thus exposed on the section or sections of the underlying leaf, will be in reading registration with the matter contained on the unturned portion of the leaf first mentioned.

2. A chart or book comprising a plurality of leaves containing reading matter and bound together at their upper ends, each of said leaves being slitted or divided vertically or crosswise of the reading-lines to form sections so that any section of one leaf may be turned independently of the other sections of the same leaf to bring the reading matter of one or more of said other sections into reading registration with the reading matter on the leaf-section below said turned or raised section.

3. As an article of manufacture, a chart or book comprising one or more entire or undivided leaves containing words or symbols, and a plurality of slitted or sectional leaves, all of said leaves being bound together at their top edge, and said slitted leaves containing words or reading matter, the slit or slits of one leaf registering with those of all the other slitted leaves, whereby when one or more sections of one slitted leaf are turned up, the reading matter thus exposed on the section or sections of the underlying leaf will be in reading registration with the matter contained on the unturned portion of the slitted leaf first mentioned; substantially as described.

In testimony whereof I affix my signature in presence of two witnesses.

LOUISE SNYDER.

Witnesses:
JAS. F. WILLIAMSON,
LILLIAN C. ELMORE.